United States Patent
Zhang et al.

(10) Patent No.: US 12,021,797 B2
(45) Date of Patent: Jun. 25, 2024

(54) TIME DIVISION DUPLEXING SPLIT CONFIGURATION BASED ON CROSS-LINK INTERFERENCE

(71) Applicant: QUALCOMM Incorporated, San Diego, CA (US)

(72) Inventors: Qian Zhang, Basking Ridge, NJ (US); Yan Zhou, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 17/646,590

(22) Filed: Dec. 30, 2021

(65) Prior Publication Data
US 2023/0216652 A1  Jul. 6, 2023

(51) Int. Cl.
*H04L 5/14*  (2006.01)
*H04L 5/22*  (2006.01)

(52) U.S. Cl.
CPC .............. *H04L 5/1438* (2013.01); *H04L 5/22* (2013.01)

(58) Field of Classification Search
None
See application file for complete search history.

(56) References Cited

U.S. PATENT DOCUMENTS

| | | | | |
|---|---|---|---|---|
| 2021/0337497 | A1* | 10/2021 | Siomina | H04J 11/0079 |
| 2022/0103333 | A1* | 3/2022 | Ghozlan | H04W 8/00 |
| 2023/0095424 | A1* | 3/2023 | Gurney | H04L 5/14 370/252 |

\* cited by examiner

*Primary Examiner* — Hong Shao
(74) *Attorney, Agent, or Firm* — Harrity & Harrity, LLP

(57) ABSTRACT

Various aspects of the present disclosure generally relate to wireless communication. In some aspects, a first network node may obtain a time division duplexing (TDD) split configuration, for inter-node interference mitigation, that is based at least in part on at least one of a subset of compatible beam pairs of a set of beam pairs or a subset of non-compatible beam pairs of the set of beam pairs, and that indicates a first restriction duration and a second restriction duration, a beam pair of the set of beam pairs comprising an uplink beam associated with the first network node and a downlink beam associated with a second network node. The first network node may communicate with at least one user equipment (UE) based at least in part on the TDD split configuration for inter-node interference mitigation. Numerous other aspects are described.

30 Claims, 8 Drawing Sheets

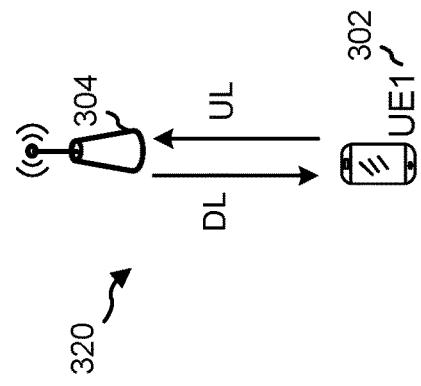
FIG. 3B
FIG. 3C
FIG. 3A

TIME DIVISION DUPLEXING SPLIT CONFIGURATION BASED ON CROSS-LINK INTERFERENCE

FIELD OF THE DISCLOSURE

Aspects of the present disclosure generally relate to wireless communication and to techniques and apparatuses for time division duplexing split configuration based on cross-link interference.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network node for wireless communication. The first network node may include a memory and one or more processors coupled to the memory. The one or more processors may be configured to obtain a time division duplexing (TDD) split configuration, for inter-node interference mitigation, that is based at least in part on at least one of a subset of compatible beam pairs of a set of beam pairs or a subset of non-compatible beam pairs of the set of beam pairs, and that indicates a first restriction duration and a second restriction duration, a beam pair of the set of beam pairs comprising an uplink beam associated with the first network node and a downlink beam associated with a second network node. The one or more processors may be configured to communicate with at least one user equipment (UE) based at least in part on the TDD split configuration for inter-node interference mitigation.

Some aspects described herein relate to a first network node for wireless communication. The first network node may include a memory and one or more processors coupled to the memory. The one or more processors may be configured to obtain a TDD split configuration for inter-node interference mitigation, that is based at least in part on at least one of a subset of compatible beam pairs of a set of beam pairs or a subset of non-compatible beam pairs of the set of beam pairs and that indicates a first restriction duration and a second restriction duration, a beam pair of the set of beam pairs comprising a downlink beam associated with the first network node and an uplink beam associated with a second network node. The one or more processors may be configured to communicate with at least one UE based at least in part on the TDD split configuration for inter-node interference mitigation.

Some aspects described herein relate to a method of wireless communication performed by a first network node. The method may include obtaining a TDD split configuration, for inter-node interference mitigation, that is based at least in part on at least one of a subset of compatible beam pairs of a set of beam pairs or a subset of non-compatible beam pairs of the set of beam pairs, and that indicates a first restriction duration and a second restriction duration, a beam pair of the set of beam pairs comprising an uplink beam associated with the first network node and a downlink beam associated with a second network node. The method may include communicating with at least one UE based at least in part on the TDD split configuration for inter-node interference mitigation.

Some aspects described herein relate to a method of wireless communication performed by a first network node. The method may include obtaining a TDD split configuration for inter-node interference mitigation, that is based at least in part on at least one of a subset of compatible beam pairs of a set of beam pairs or a subset of non-compatible beam pairs of the set of beam pairs and that indicates a first restriction duration and a second restriction duration, a beam pair of the set of beam pairs comprising a downlink beam associated with the first network node and an uplink beam associated with a second network node. The method may include communicating with at least one UE based at least in part on the TDD split configuration for inter-node interference mitigation.

Some aspects described herein relate to a non-transitory computer-readable medium that stores a set of instructions for wireless communication by a first network node. The set of instructions, when executed by one or more processors of the first network node, may cause the first network node to obtain a TDD split configuration, for inter-node interference mitigation, that is based at least in part on at least one of a subset of compatible beam pairs of a set of beam pairs or a subset of non-compatible beam pairs of the set of beam pairs, and that indicates a first restriction duration and a second restriction duration, a beam pair of the set of beam pairs comprising an uplink beam associated with the first network node and a downlink beam associated with a second network node. The set of instructions, when executed by one or more processors of the first network node, may cause the first network node to communicate with at least one UE based at least in part on the TDD split configuration for inter-node interference mitigation.

Some aspects described herein relate to a non-transitory computer-readable medium that stores a set of instructions for wireless communication by a first network node. The set of instructions, when executed by one or more processors of the first network node, may cause the first network node to obtain a TDD split configuration for inter-node interference mitigation, that is based at least in part on at least one of a subset of compatible beam pairs of a set of beam pairs or a subset of non-compatible beam pairs of the set of beam pairs and that indicates a first restriction duration and a second restriction duration, a beam pair of the set of beam pairs comprising a downlink beam associated with the first network node and an uplink beam associated with a second network node. The set of instructions, when executed by one or more processors of the first network node, may cause the first network node to communicate with at least one UE based at least in part on the TDD split configuration for inter-node interference mitigation.

Some aspects described herein relate to an apparatus for wireless communication. The apparatus may include means for obtaining a TDD split configuration, for inter-node interference mitigation, that is based at least in part on at least one of a subset of compatible beam pairs of a set of beam pairs or a subset of non-compatible beam pairs of the set of beam pairs, and that indicates a first restriction duration and a second restriction duration, a beam pair of the set of beam pairs comprising an uplink beam associated with the apparatus and a downlink beam associated with a network node. The apparatus may include means for communicating with at least one UE based at least in part on the TDD split configuration for inter-node interference mitigation.

Some aspects described herein relate to an apparatus for wireless communication. The apparatus may include means for obtaining a TDD split configuration for inter-node interference mitigation, that is based at least in part on at least one of a subset of compatible beam pairs of a set of beam pairs or a subset of non-compatible beam pairs of the set of beam pairs and that indicates a first restriction duration and a second restriction duration, a beam pair of the set of beam pairs comprising a downlink beam associated with the apparatus and an uplink beam associated with a network node. The apparatus may include means for communicating with at least one UE based at least in part on the TDD split configuration for inter-node interference mitigation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex communication in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
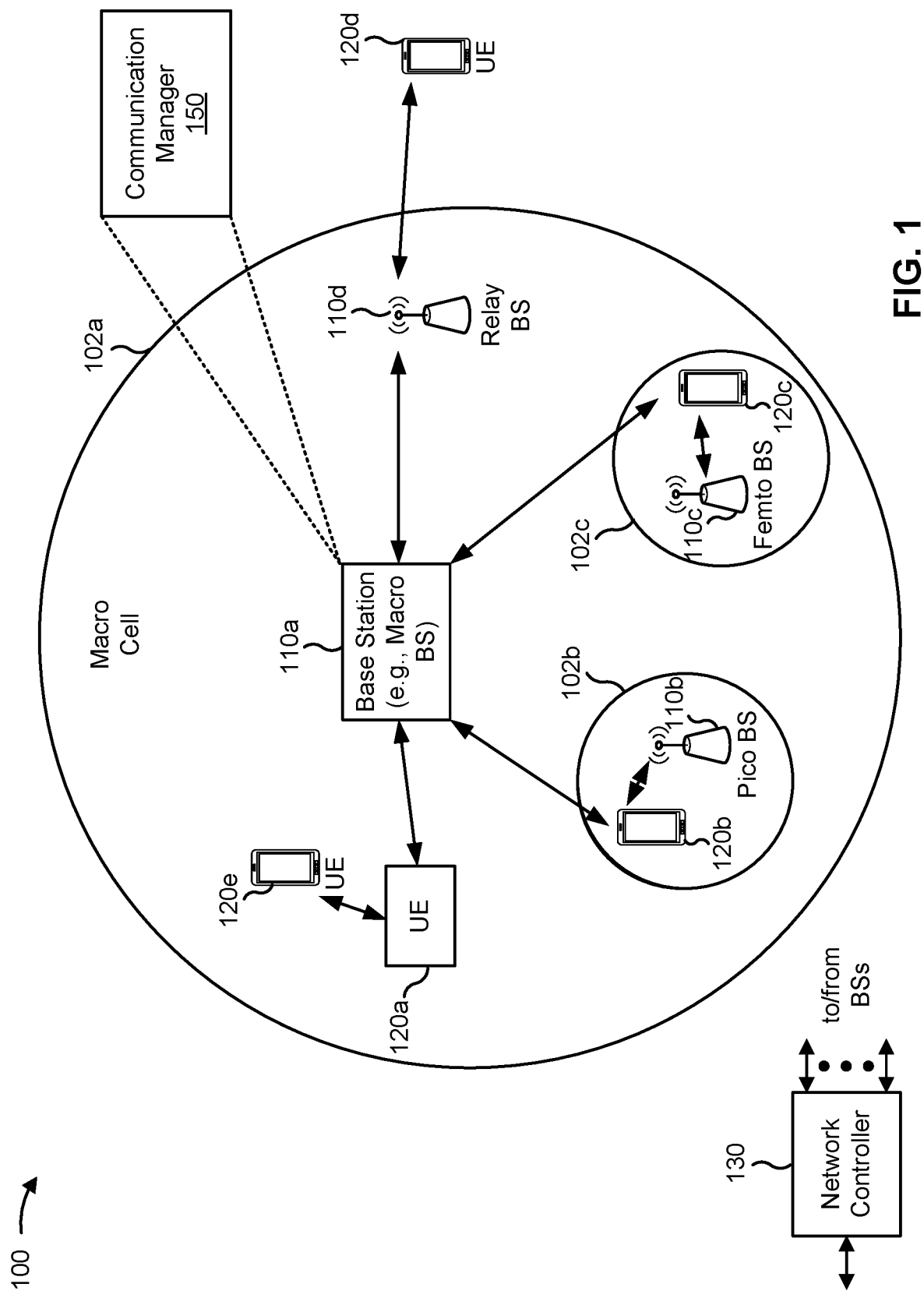
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

An IAB network may include an IAB donor that connects to a core network via a wired connection (e.g., a wireline backhaul). For example, an Ng interface of an IAB donor may terminate at a core network. Additionally, or alternatively, an IAB donor may connect to one or more devices of the core network that provide a core access and mobility management function (AMF). In some aspects, an IAB donor may include a base station 110, such as an anchor base station. An IAB donor may include a central unit (CU), which may perform access node controller (ANC) functions and/or AMF functions. The CU may configure a distributed unit (DU) of the IAB donor and/or may configure one or more IAB nodes (e.g., a mobile termination (MT) function and/or a distributed unit (DU) function of an IAB node) that connect to the core network via the IAB donor. Thus, a CU of an IAB donor may control and/or configure the entire IAB network (or a portion thereof) that connects to the core network via the IAB donor, such as by using control messages and/or configuration messages (e.g., a radio resource control (RRC) configuration message or an F1 application protocol (F1AP) message).

The MT functions of an IAB node (e.g., a child node) may be controlled and/or scheduled by another IAB node (e.g., a parent node of the child node) and/or by an IAB donor. The DU functions of an IAB node (e.g., a parent node) may control and/or schedule other IAB nodes (e.g., child nodes of the parent node) and/or UEs 120. Thus, a DU may be referred to as a scheduling node or a scheduling component, and an MT may be referred to as a scheduled node or a scheduled component. In some aspects, an IAB donor may include DU functions and not MT functions. That is, an IAB donor may configure, control, and/or schedule communications of IAB nodes and/or UEs 120. A UE 120 may include only MT functions, and not DU functions. That is, communications of a UE 120 may be controlled and/or scheduled by an IAB donor and/or an IAB node (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor or an IAB node, and a child node may be an IAB node or a UE 120. Communications of an MT function of a child node may be controlled and/or scheduled by a parent node of the child node.

A link between a UE 120 and an IAB donor, or between a UE 120 and an IAB node, may be referred to as an access link. An access link may be a wireless access link that provides a UE 120 with radio access to a core network via an IAB donor, and optionally via one or more IAB nodes. Thus, the network 100 may be referred to as a multi-hop network or a wireless multi-hop network.

A link between an IAB donor and an IAB node or between two IAB nodes may be referred to as a backhaul link. A backhaul link may be a wireless backhaul link that provides an IAB node with radio access to a core network via an IAB donor, and optionally via one or more other IAB nodes. In an IAB network, network resources for wireless communications (e.g., time resources, frequency resources, and/or spatial resources) may be shared between access links and backhaul links. In some aspects, a backhaul link may be a primary backhaul link or a secondary backhaul link (e.g., a backup backhaul link). In some aspects, a secondary backhaul link may be used if a primary backhaul link fails, becomes congested, and/or becomes overloaded, among other examples.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a node, which may be referred to as a "node," a "network node," or a "wireless node," may be a base station (e.g., base station 110), a relay device, a network controller, an apparatus, a device, a computing system, one or more components of any of these, and/or another processing entity configured to perform one or more aspects of the techniques described herein. For example, a network node may be a base station. As an example, a first network node may be configured to communicate with a second network node or a third network node. The adjectives "first," "second," "third," and so on are used for contextual distinction between two or more of the modified nouns in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Similarly, reference to a base station, apparatus, device, computing system, or the like may include disclosure of the base station, apparatus, device, computing system, or the like being a network node.

In some aspects, the first network node may include a communication manager 150. As described in more detail elsewhere herein, the communication manager 150 may obtain a time division duplexing (TDD) split configuration, for inter-node interference mitigation, that is based at least in part on at least one of a subset of compatible beam pairs of a set of beam pairs or a subset of non-compatible beam pairs of the set of beam pairs, and that indicates a first restriction duration and a second restriction duration, a beam pair of the set of beam pairs comprising an uplink beam associated with the first network node and a downlink beam associated with a second network node; and communicate with at least one UE based at least in part on the TDD split configuration for inter-node interference mitigation. Additionally, or alternatively, the communication manager 150 may perform one or more other operations described herein.

In some aspects, the communication manager 150 may obtain a TDD split configuration for inter-node interference mitigation, that is based at least in part on at least one of a subset of compatible beam pairs of a set of beam pairs or a subset of non-compatible beam pairs of the set of beam pairs and that indicates a first restriction duration and a second restriction duration, a beam pair of the set of beam pairs comprising a downlink beam associated with the first network node and an uplink beam associated with a second network node; and communicate with at least one UE based at least in part on the TDD split configuration for inter-node interference mitigation. Additionally, or alternatively, the communication manager 150 may perform one or more other operations described herein.

As indicated above, FIG. 1 is provided as an example. Other examples may differ from what is described with regard to FIG. 1.

Figure 2:
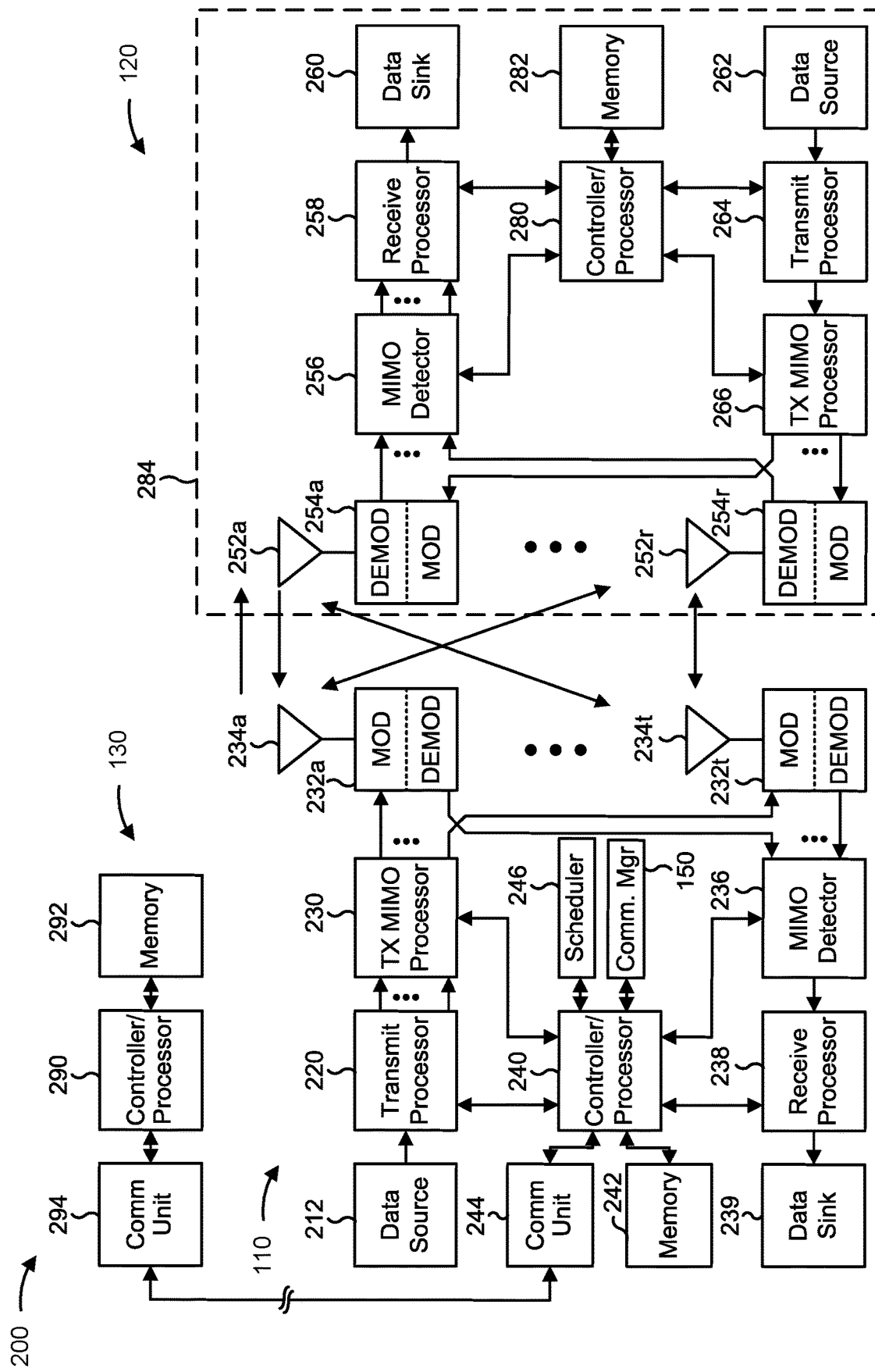
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, and/or any other component(s) of FIG. 2 may perform one or more techniques associated with a TDD split configuration based on cross-link interference, as described in more detail elsewhere herein. In some aspects, the network node (e.g., the first network node and/or the second network node) described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the first network node includes means for obtaining a TDD split configuration, for inter-node interference mitigation, that is based at least in part on at least one of a subset of compatible beam pairs of a set of beam pairs or a subset of non-compatible beam pairs of the set of beam pairs, and that indicates a first restriction duration and a second restriction duration, a beam pair of the set of beam pairs comprising an uplink beam associated with the first network node and a downlink beam associated with a second network node; and/or means for communicating with at least one UE based at least in part on the TDD split configuration for inter-node interference mitigation. In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the first network node includes means for obtaining a TDD split configuration for inter-node interference mitigation, that is based at least in part on at least one of a subset of compatible beam pairs of a set of beam pairs or a subset of non-compatible beam pairs of the set of beam pairs and that indicates a first restriction duration and a second restriction duration, a beam pair of the set of beam pairs comprising a downlink beam associated with the first network node and an uplink beam associated with a second network node; and/or means for communicating with at least one UE based at least in part on the TDD split configuration for inter-node interference mitigation. In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of full duplex communication in accordance with the present disclosure. The example 300 of FIG. 3A includes a UE1 302 and two network nodes (e.g., base stations and/or TRPs, among other examples) 304-1, 304-2. The UE1 302 is sending uplink (UL) transmissions to network node 304-1 and is receiving downlink (DL) transmissions from network node 304-2. In the example 300 of FIG. 3A, full duplex is enabled for the UE1 302, but not for the network nodes 304-1, 304-2. The example 310 of FIG. 3B includes two UEs, UE1 302-1 and UE2 302-2, and a network node 304. The UE1 302-1 is receiving a DL transmission from the network node 304 and the UE2 302-2 is transmitting a UL transmission to the network node 304. In the example 310 of FIG. 3B, full duplex is enabled for the network node 304, but not for the UEs UE1 302-1 and UE2 302-2. The example 320 of FIG. 3C includes a UE1 302 and a network node 304. The UE1 302 is receiving a DL transmission from the network node 304 and the UE1 302 is transmitting a UL transmission to the network node 304. In the example 320 of FIG. 3C, full duplex is enabled for both the UE1 302 and the network node 304.

The present disclosure generally relates to scheduling resources for full duplex communication. Full duplex capability may be present at either a network node or a UE, or both. For example, for a UE, UL transmission may be from one antenna panel, and DL reception may be in another antenna panel. Full duplex communication may be conditional on a beam separation of the UL beam and DL beam at the respective antenna panels. Utilizing full duplex communication may provide a reduction in latency, such that it may be possible to receive a DL signal in UL-only slots, which may enable latency savings. In addition, full duplex communication may enhance spectrum efficiency per cell or per UE, and may allow for a more efficient utilization of resources.

Beam separation of the UL and DL beams assists in limiting or reducing self-interference that may occur during full duplex communication. It is desirable to select UL and DL beams that are on different antenna panels to minimize self-interference. Determining the UL and DL beams that are separated on their respective antenna panels may provide a reliable full duplex communication by facilitating selection of beam pairs that minimize or reduce self-interference.

A full duplex UE may perform a self-interference measurement (SIM) procedure in order to identify self-interference from transmissions of the full duplex UE. A full duplex network node also may perform a SIM procedure in order to identify self-interference from transmissions of the full duplex network node. The UE may provide a measurement report to the network node to indicate results of the UE SIM. The network node may select pairs of beams (referred to herein as "beam pairs") for the UE ("UE beam pairs") and the network node ("network node beam pairs") to use during full duplex communications. A beam pair may include a UL beam and a DL beam. In some aspects, a beam pair may include a receive (Rx) beam and a transmit (Tx) beam.

The UL and DL beam pairs may be used to transmit and receive communications, respectively. However, to facilitate the communications, resources must be scheduled. DL and UL transmissions may include dynamic traffic, semi-persistent traffic, and/or periodic traffic. Additionally, or alternatively, full duplex communications may be useful if scheduled across two or more component carriers (CCs), for multiple TRP (mTRP) communications, and/or for repetitions.

As indicated above, FIGS. 3A-3C are provided as one or more examples. Other examples may differ from what is described with regard to FIGS. 3A-3C.

Figure 4:
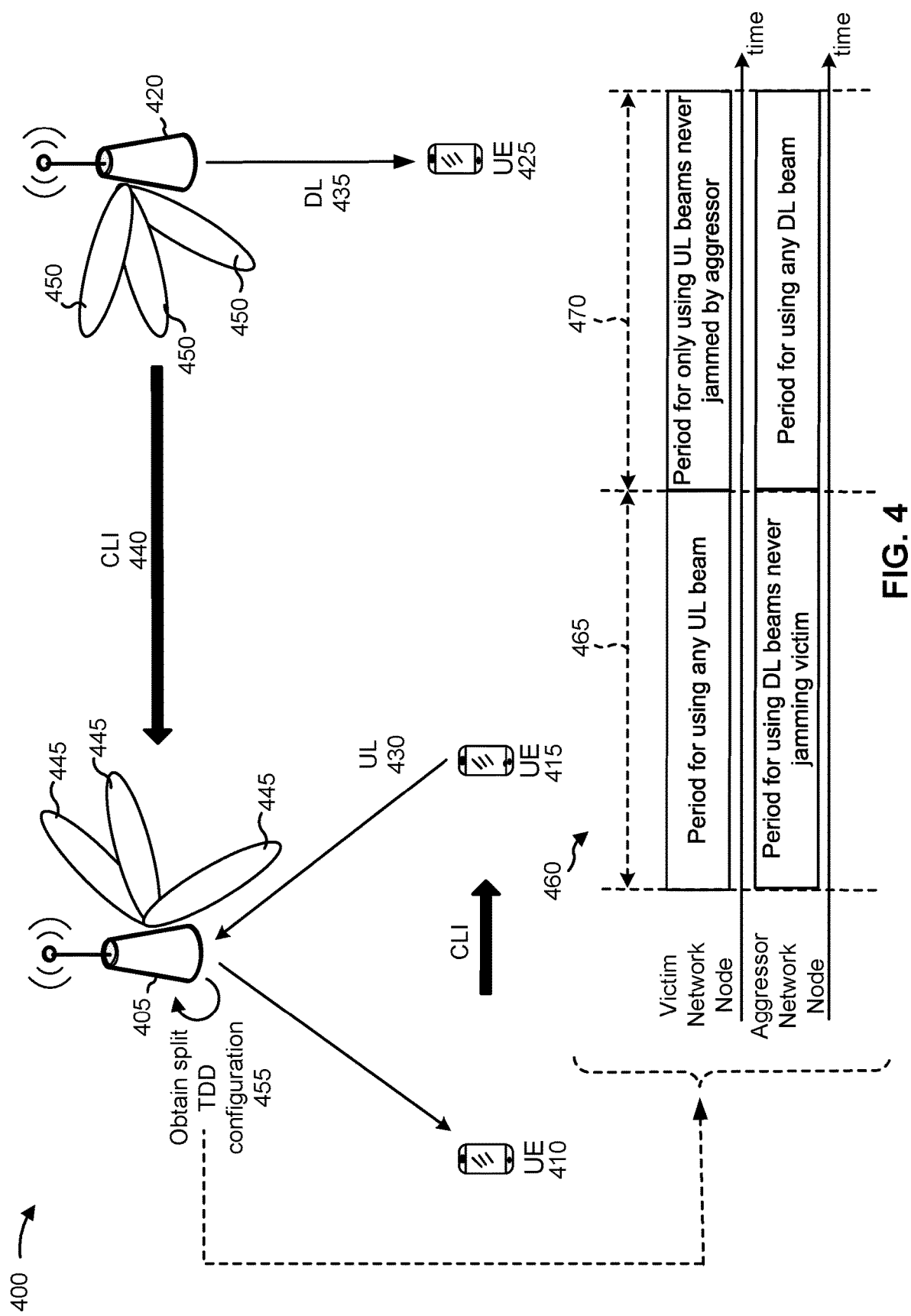
FIG. 4 is a diagram illustrating an example 400 relating to cross-link interference detection and mitigation, in accordance with the present disclosure.

FIG. 4 is a diagram illustrating an example 400 relating to cross-link interference detection and mitigation, in accordance with the present disclosure. As shown, a network node 405 may communicate with a UE 410 and a UE 415. A network node 420 may communicate with a UE 425. In some aspects, the network node 405 and/or the network node 420 may communicate (e.g., with the respective UEs 410, 415, and 425) using dynamic TDD.

In dynamic TDD, the allocation of network resources to uplink and downlink can be dynamically modified depending on a traffic load. For example, the network node 405 can configure a TDD configuration (e.g., a TDD pattern) with more uplink transmission time intervals (TTIs) (e.g., frames, subframes, slots, mini-slots, and/or symbols) for a UE 410 and/or 415 when the UE 410 and/or 415 has uplink data to transmit, and can configure a TDD configuration with more downlink TTIs for the UE 410 and/or 415 when the UE 410 and/or 415 has downlink data to receive. The TDD configuration can be dynamically configured to modify the allocation of uplink TTIs and downlink TTIs used for communication between the network node 405 and the UE 410 and/or 415.

As shown in FIG. 4, when neighboring network nodes 405 and 420 use different TDD configurations to communicate with UEs 410, 415, and 425, respectively, this can result in an uplink communication (shown as "UL") 430 between the network node 405 and the UE 415 in a same TTI as a downlink communication (shown as "DL") 435 between the network node 420 and the UE 425. These communications in different transmission directions (e.g., downlink vs. uplink) in the same TTI may interfere with one another, which may be referred to as cross-link interference.

For example, the downlink communication 435 transmitted by the network node 420 may be received by the network node 405, and may interfere with reception, by the network node 405, of the uplink communication 430 from the UE 415. This may be referred to as cross-link interference (CLI) 440, downlink-to-uplink (DL-to-UL) interference, base station to base station interference, gNB-to-gNB interference, or network node to network node interference. In this situation, the network node 405 may be referred to as a "victim network node" and the network node 420 may be referred to as an "aggressor network node." This type of CLI can occur, for example, during flexible TDD communications and/or full duplex communications, and can cause the network node 405 to miss data packets in the uplink communication 430 and/or to request otherwise unnecessary retransmissions from the UE 415, thereby leading to negative impacts on network performance.

Some aspects of the techniques and apparatuses described herein may provide a split TDD configuration that may be used by a victim network node and an aggressor network node for communicating with respective UEs. In some aspects, a victim network node (e.g., the network node 405) may obtain CLI measurements associated with beam pairs, each of which includes an uplink beam (e.g., one of the uplink beams 445) associated with the victim network node (e.g., the network node 405) and a downlink beam (e.g., one of the downlink beams 450) associated with the aggressor network node (e.g., the network node 420). The victim network node 405 may determine, based at least in part on the CLI measurements, compatible beam pairs and non-compatible beam pairs, and may indicate the same to the aggressor network node 420. A beam pair may be a compatible beam pair based at least in part on a performance metric, associated with an impact of a corresponding CLI on an uplink beam, satisfying at least one interference tolerance criterion. The at least one interference tolerance criterion may be associated with an impact of the CLI on an associated downlink communication and/or an associated uplink communication. A beam pair may be a non-compatible beam pair based at least in part on the performance metric failing to satisfy the at least one interference tolerance criterion. The victim network node 405, the aggressor network node 420, and/or a centralized unit may determine a split TDD configuration, which may be obtained by the victim network node 405 and the aggressor network node 420. The victim network node 405 and the aggressor network node 420 may use the split TDD configuration to communicate with respective UEs (e.g., UE 410, UE 415, and UE 425, respectively).

For example, as shown by reference number 455, the victim network node 405 may obtain a split TDD configuration 460. The split TDD configuration 460 may include a first restriction duration 465 and a second restriction duration 470. In some aspects, the first restriction duration 465 may be referred to as an aggressor network node restriction duration because communication activities of the aggressor network node may be restricted during the first restriction duration 465. In some aspects, the second restriction duration 470 may be referred to as a victim network node restriction duration because communication activities of the victim network node may be restricted during the second restriction duration 470. In some aspects, the first restriction duration 465 may include a non-flexible TDD duration and the second restriction duration 470 may include a flexible TDD duration.

In some aspects, a wireless communication standard may specify rules for aggressor and victim behaviors during the restriction durations 465 and 470. For example, in some aspects, the first restriction duration 465 may be a time period during which the network node 405 may receive uplink communications using any of the uplink beams 445 (e.g., compatible beams and/or non-compatible beams) on a protected resource of the network node 405 (e.g., an uplink symbol). The network node 420 may treat the protected resource of the network node 405 as a downlink symbol and may only use compatible downlink beams 450 during the first restriction duration 465. The second restriction duration 470 may be a time period during which the network node 405 may use only compatible uplink beams 445 on a protected resource of the network node 405 (e.g., an uplink symbol). The network node 420 may transmit using any downlink beam 450 (e.g., compatible downlink beams and/or non-compatible downlink beams) on a protected resource of the network node 405 during the second restriction duration 470.

In some aspects, the split TDD configuration may provide fairness for the victim network node 405 and the aggressor network node 420 to use its associated uplink (shown in FIG. 4 as "UL") or downlink (shown in FIG. 4 as "DL") beams in a specified duration (e.g., instead of always restricting the aggressor network node 420 or always restricting the victim network node 405). In some aspects, the split TDD configuration and/or behaviors associated therewith may be specified in a wireless communication standard. For example, the wireless communication standard may specify a first set of rules for the first restriction duration 465 and a second set of rules for the second restriction duration 470.

In some aspects, as shown in FIG. 4, during the first restriction duration 465, the victim network node (e.g., network node 405) may use any uplink (UL) beams (e.g. a non-compatible uplink beam may be used) on its own protected resource (e.g., an RRC uplink symbol), and the aggressor network node (e.g., network node 420) may use the resource as a downlink symbol but the aggressor network node may use only the downlink (DL) beams that never jam (e.g., cause an amount of CLI that fails to satisfy an interference tolerance criterion) the victim network node (e.g., network node 405), indicated by a neighbor victim network node (e.g., network node 405) on the neighbor victim network node's protected resources (e.g., RRC uplink symbols or RRC flexible symbols).

In some aspects, as shown, during the second restriction duration 470, the victim network node (e.g., network node 405) may use only compatible uplink beams that are never jammed by the aggressor network node on the victim network node's protected resource (e.g., an RRC uplink symbol or RRC flexible symbol). During the second restriction duration 470, the aggressor network node may use any downlink beam on the protected resource of the victim network node (e.g., since compatible uplink beams can work with any downlink beam). In this way, all uplink beams (non-compatible and compatible) and downlink beams of both victim and aggressor network nodes may be provided an improvement in fairness of usage.

Accordingly, by implementing the split TDD configuration, some aspects may provide fairness in resource use to the victim and aggressor. In this way, some aspects described herein may mitigate CLI between network nodes and increase efficiency of resource allocation, thereby facilitating full duplex communication and reducing the occurrence of missed packets and retransmissions, resulting in positive impacts on network performance.

As indicated above, FIG. 4 is provided as an example. Other examples are possible and may differ from what was described with respect to FIG. 4.

Figure 5:
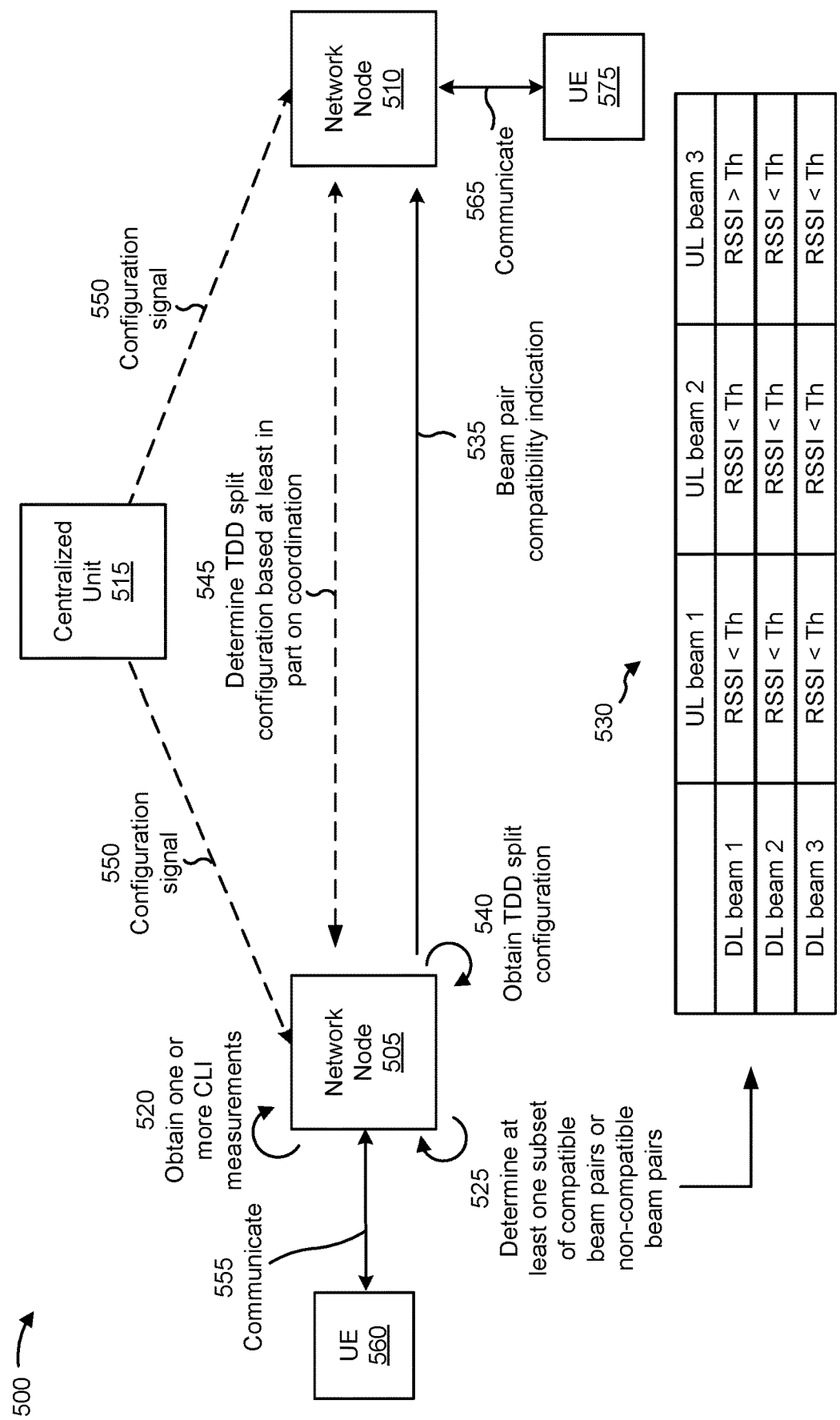
FIG. 5 is a diagram illustrating an example associated with a time division duplexing (TDD) split configuration based on cross-link interference, in accordance with the present disclosure.

FIG. 5 is a diagram illustrating an example 500 associated with TDD split configuration based on cross-link interference, in accordance with the present disclosure. As shown in FIG. 5, a network node 505 and a network node 510 may communicate with one another. In some aspects, a centralized unit 515 may communicate with the network node 505 and/or the network node 510. In some aspects, the network node 505 may be referred to as a first network node 505 or a second network node 505, and the network node 510 may be referred to as a second network node 510 or a first network node 510, respectively. In some aspects, the network node 505 and/or the network node 510 may be, or be similar to, the network node 405 and/or the network node 420 depicted in FIG. 4. In some aspects, the centralized unit 515 may include a network node, a base station, a relay station, a CU of an IAB network, and/or an operations, administration and management function (AMF), among other examples.

As shown by reference number 520, the network node 505 may obtain one or more CLI measurements associated with a set of beam pairs. Each beam pair of the set of beam pairs may include an uplink beam associated with the network node 505 and a downlink beam associated with the network node 510. In FIG. 5, uplink beams associated with the network node 505 are referred to as "UL beam 1," "UL beam 2," and "UL beam 3," and downlink beams associated with the network node 510 are referred to as "DL beam 1," "DL beam 2," and "DL beam 3." In some aspects, for example, the set of beam pairs may include all of the possible beam pairs in which one of the beams is an uplink beam and the other beam is a downlink beam. For example, the set of beam pairs may include the following beam pairs: (DL beam 1, UL beam 1), (DL beam 1, UL beam 2), (DL beam 1, UL beam 3), (DL beam 2, UL beam 1), (DL beam 2, UL beam 2), (DL beam 2, UL beam 3), (DL beam 3, UL beam 1), (DL beam 3, UL beam 2), and (DL beam 3, UL beam 3). In some aspects, any number of additional uplink and/or downlink beams (or fewer uplink and/or downlink beams) may be associated with the network node 505 and/or the network node 510, respectively. As a result, in some aspects, any number of fewer or more beam pairs may be included in the set of beam pairs.

In some aspects, the network node 505 may obtain the one or more CLI measurements based at least in part on determining an RSSI corresponding to each downlink beam associated with the network node 510. In some aspects, the network node 505 may obtain the one or more CLI measurements based at least in part on determining an RSRP corresponding to each downlink beam associated with the network node 510.

In some aspects, the network node 505 may obtain the one or more CLI measurements in an a-periodic manner. For example, the network node 505 may transmit a beam pair compatibility indication request to the network node 505, and the network node 505 may obtain the one or more CLI measurements based at least in part on receiving the beam pair compatibility indication request. In some aspects, the network node 505 may obtain the one or more CLI measurements periodically. In some aspects, the network node 505 may obtain the one or more CLI measurements in a semi-persistent manner. In some aspects, the network node 505 may obtain the one or more CLI measurements based at least in part on detecting an occurrence of a trigger event. For example, in some aspects, the trigger event may include a change in a CLI measurement associated with a beam pair.

As shown by reference number 525, the network node 505 may determine, based at least in part on the one or more CLI measurements, at least one of a subset of compatible beam pairs or a subset of non-compatible beam pairs. In some aspects, a beam pair may be a compatible beam pair based at least in part on a performance metric, associated with an impact of a corresponding cross-link interference on the uplink beam, satisfying at least one tolerance criterion. A beam pair may be a non-compatible beam pair based at least in part on the performance metric failing to satisfy the at least one tolerance criterion. In some aspects, the performance metric may include, for example, an RSSI and/or an RSRP, among other examples. The at least one tolerance criterion may include at least one compatibility threshold (e.g., an RSSI threshold and/or an RSRP threshold, among other examples).

For example, in some aspects, the network node 505 may determine the at least one of the subset of compatible beam pairs or the subset of non-compatible beam pairs based at least in part on determining whether each RSSI satisfies a compatibility threshold (shown as "Th"). In some aspects, as shown in FIG. 5, the network node 505 may generate a table 530 (or other data structure that may be conceptually representable as a table) that indicates compatible and/or non-compatible beam pairs. As shown, for example, the table 530 may indicate, for each beam pair, whether the associated RSSI satisfies the compatibility threshold.

In the illustrated example, an RSSI satisfies the compatibility threshold if the RSSI is less than the compatibility threshold, and the RSSI fails to satisfy the compatibility threshold if the RSSI is greater than the RSSI threshold. In some aspects, an RSSI may satisfy a compatibility threshold if the RSSI is less than or equal to the compatibility threshold, and/or the RSSI may fail to satisfy the compatibility threshold if the RSSI is greater than or equal to the RSSI threshold. In some aspects, an RSSI may satisfy a compatibility threshold if the RSSI is greater than (or greater than or equal to) the compatibility threshold, and/or the RSSI may fail to satisfy the compatibility threshold if the RSSI is less than (or less than or equal to) the compatibility threshold. In some aspects, a function of the RSSI (or other metric such as, for example, an RSRP) may be compared to the compatibility threshold. For example, instead of (or in addition to) using an RSSI, the network node 505 may use a log(RSSI), an inverse of the RSSI, and/or a linear function of an RSSI to determine compatible and/or non-compatible beam pairs.

As shown by reference number 535, the network node 505 may transmit, and the network node 510 may receive, a beam pair compatibility indication. The beam pair compatibility indication may indicate the at least one of the subset of compatible beam pairs or the subset of non-compatible beam pairs. In some aspects, the network node 505 may transmit the beam pair compatibility indication in an a-periodic manner. For example, the network node 505 may transmit a beam pair compatibility indication request to the network node 505, and the network node 505 may transmit the beam pair compatibility indication to the network node 510 based at least in part on receiving the beam pair compatibility indication request. In some aspects, the network node 505 may transmit the beam pair compatibility indication periodically. In some aspects, the network node 505 may transmit the beam pair compatibility indication in a semi-persistent manner. In some aspects, the network node 505 may transmit the beam pair compatibility indication based at least in part on detecting an occurrence of a trigger event. For example, in some aspects, the trigger event may include an update to one or more determinations of compatibility. In some aspects, for example, the network node 505 may determine that a previously compatible beam pair has become non-compatible, or vice versa, and may transmit the beam pair compatibility based at least in part on that determination.

As shown by reference number 540, in some aspects, the network node 505 may obtain a TDD split configuration for inter-node interference mitigation. The TDD split configuration may be based at least in part on at least one of a subset of compatible beam pairs of a set of beam pairs or a subset of incompatible beam pairs of the set of beam pairs. The TDD split configuration may indicate a first restriction duration and a second restriction duration. The network node 505 may obtain the TDD split configuration based at least in part on determining the TDD split configuration based at least in part on the at least one of the subset of compatible beam pairs or the subset of incompatible beam pairs. In some aspects, the network node 505 may transmit an indication of the TDD split configuration to the network node 510.

In some aspects, as shown by reference number 545, the network node 505 and/or the network node 510 may obtain the TDD split configuration based at least in part on a coordination between the network node 505 and the network node 510. For example, in some aspects, the network node 505 and the network node 510 may share information and/or negotiate so that the TDD split configuration may be generated by the network node 505 and/or the network node 510.

As shown by reference number 550, the network node 505 and/or the network node 510 may obtain the TDD split configuration based at least in part on receiving a configuration signal that indicates the TDD split configuration. For example, as shown, the network node 505 and/or the network node 510 may receive the configuration signal from the centralized unit 515.

As shown by reference number 555, the network node 505 may communicate with at least one UE 560 based at least in part on the TDD split configuration. Similarly, as shown by reference number 565, the network node 510 may communicate with at least one UE 575. In some aspects, as indicated above, the TDD split configuration may indicate a first restriction duration and a second restriction duration.

In some aspects, the first restriction duration may include at least one non-flexible TDD duration. In some aspects, the first restriction duration may include a time period during which no communications are transmitted using a non-compatible downlink beam associated with the network node 510 on a protected time resource associated with the network node 505. In some aspects, the protected time resource may include at least one of an uplink symbol or a flexible symbol. In some aspects, during the first restriction duration, the network node 505 may communicate the UE 560 based at least in part on receiving, on the protected time resource associated with the network node 505, at least one uplink communication using at least one of a compatible uplink beam associated with the network node 505 or a non-compatible uplink beam associated with the network node 505. In some aspects, during the first restriction duration, the network node 510 may communicate with the UE 575 based at least in part on refraining from transmitting a downlink communication using a non-compatible downlink beam associated with the network node 510 on the protected time resource associated with the first network node 505. In some aspects, during the first restriction duration, the network node 510 may communicate with the UE 575 based at least in part on transmitting at least one downlink communication using only at least one compatible downlink beam associated with the network node 510 on the protected time resource associated with the network node 505.

In some aspects, the second restriction duration may include at least one flexible TDD duration. In some aspects, the second restriction duration may include a time period during which a communication is transmitted, on a protected time resource associated with the network node 505, using at least one of a compatible downlink beam associated with the network node 510 or a non-compatible downlink beam associated with the network node 510. In some aspects, the protected time resource may include at least one of an uplink symbol or a flexible symbol. In some aspects, during the second restriction duration, the network node 505 may communicate with the UE 560 based at least in part on receiving at least one uplink communication using only at least one compatible uplink beam associated with the network node 505 on the protected time resource associated with the network node 505. In some aspects, during the second restriction duration, the second network node 510 may communicate with the UE 575 based at least in part on transmitting, on the protected time resource associated with the network node 505, at least one downlink communication using at least one of a compatible downlink beam or a non-compatible downlink beam associated with the network node 510. In this way, all of the uplink beams (both compatible and non-compatible) may be used in a manner that promotes efficient resource consumption.

As indicated above, FIG. 5 is provided as an example. Other examples may differ from what is described with respect to FIG. 5.

Figure 6:
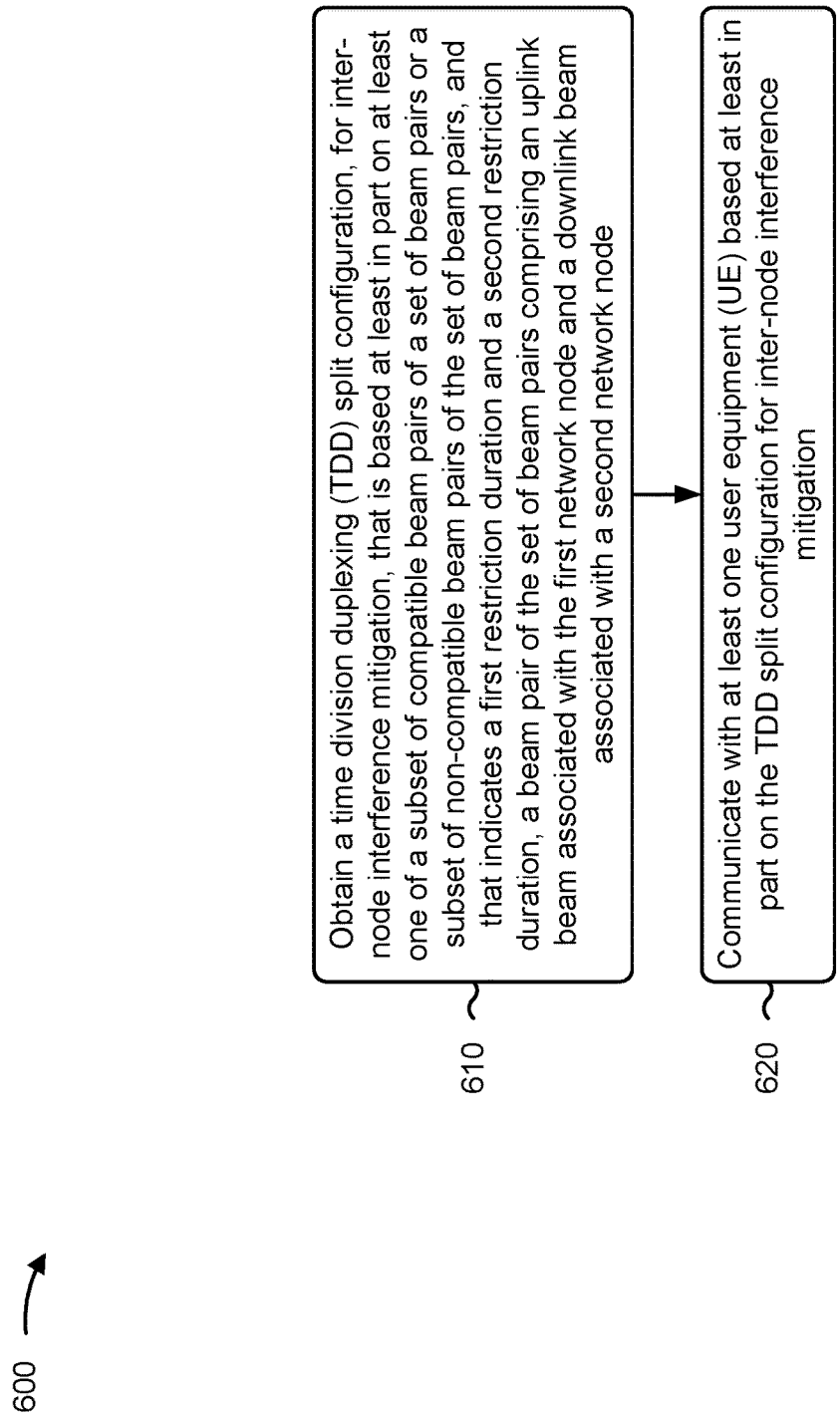
FIGS. 6 and 7 are diagrams illustrating example processes associated with a TDD split configuration based on cross-link interference, in accordance with the present disclosure.

FIG. 6 is a diagram illustrating an example process 600 performed, for example, by a first network node, in accordance with the present disclosure. Example process 600 is an example where the first network node (e.g., network node 505) performs operations associated with a TDD split configuration.

As shown in FIG. 6, in some aspects, process 600 may include obtaining a TDD split configuration, for inter-node interference mitigation, that is based at least in part on at least one of a subset of compatible beam pairs of a set of beam pairs or a subset of non-compatible beam pairs of the set of beam pairs, and that indicates a first restriction duration and a second restriction duration, a beam pair of the set of beam pairs comprising an uplink beam associated with the first network node and a downlink beam associated with a second network node (block 610). For example, the first network node (e.g., using communication manager 150, reception component 802, and/or transmission component 804, depicted in FIG. 8) may obtain a TDD split configuration, for inter-node interference mitigation, that is based at least in part on at least one of a subset of compatible beam pairs of a set of beam pairs or a subset of non-compatible beam pairs of the set of beam pairs, and that indicates a first restriction duration and a second restriction duration, a beam pair of the set of beam pairs comprising an uplink beam associated with the first network node and a downlink beam associated with a second network node, as described above.

As further shown in FIG. 6, in some aspects, process 600 may include communicating with at least one UE based at least in part on the TDD split configuration for inter-node interference mitigation (block 620). For example, the first network node (e.g., using communication manager 150, reception component 802, and/or transmission component 804, depicted in FIG. 8) may communicate with at least one UE based at least in part on the TDD split configuration for inter-node interference mitigation, as described above.

Process 600 may include additional aspects, such as any single aspect or any combination of aspects described below and/or in connection with one or more other processes described elsewhere herein.

In a first aspect, the beam pair is a compatible beam pair based at least in part on a performance metric, associated with an impact of a corresponding cross-link interference on the uplink beam, satisfying at least one tolerance criterion, or the beam pair is a non-compatible beam pair based at least in part on the performance metric failing to satisfy the at least one tolerance criterion.

In a second aspect, alone or in combination with the first aspect, process 600 includes obtaining one or more cross-link interference measurements associated with the set of beam pairs, determining, based at least in part on the one or more cross-link interference measurements, the at least one of the subset of compatible beam pairs or the subset of non-compatible beam pairs, and transmitting, to the second network node, a beam pair compatibility indication that indicates the at least one of the subset of compatible beam pairs or the subset of incompatible beam pairs.

In a third aspect, alone or in combination with the second aspect, obtaining the one or more cross-link measurements comprises determining at least one of an RSSI or an RSRP corresponding to the downlink beam associated with the second network node.

In a fourth aspect, alone or in combination with the third aspect, determining the at least one of the subset of compatible beam pairs or the subset of incompatible beam pairs comprises determining whether the at least one of the RSSI or the RSRP satisfies a respective compatibility threshold.

In a fifth aspect, alone or in combination with one or more of the first through fourth aspects, obtaining the TDD split configuration comprises determining the TDD split configuration based at least in part on the at least one of the subset of compatible beam pairs or the subset of incompatible beam pairs.

In a sixth aspect, alone or in combination with one or more of the first through fifth aspects, obtaining the TDD split configuration comprises obtaining the TDD split configuration based at least in part on a coordination between the first network node and the second network node.

In a seventh aspect, alone or in combination with one or more of the first through sixth aspects, obtaining the TDD split configuration comprises receiving a configuration signal that indicates the TDD split configuration.

In an eighth aspect, alone or in combination with the seventh aspect, receiving the TDD split configuration comprises receiving the configuration signal from a centralized unit.

In a ninth aspect, alone or in combination with the eighth aspect, the centralized unit comprises at least one of a distributed unit of a base station, a central unit of an integrated access and backhaul network node, or an AMF.

In a tenth aspect, alone or in combination with one or more of the seventh through ninth aspects, receiving the configuration signal comprises receiving the configuration signal based at least in part on a semi-static signaling pattern.

In an eleventh aspect, alone or in combination with the tenth aspect, receiving the configuration signal comprises receiving the configuration signal from the second network node.

In a twelfth aspect, alone or in combination with one or more of the first through eleventh aspects, the first restriction duration comprises at least one non-flexible TDD duration.

In a thirteenth aspect, alone or in combination with one or more of the first through twelfth aspects, the first restriction duration comprises a time period during which no communications are transmitted using a non-compatible downlink beam associated with the second network node on a protected time resource associated with the first network node.

In a fourteenth aspect, alone or in combination with the thirteenth aspect, the protected time resource comprises at least one of an uplink symbol or a flexible symbol.

In a fifteenth aspect, alone or in combination with one or more of the thirteenth through fourteenth aspects, communicating with the at least one UE comprises receiving, on the protected time resource associated with the first network node, at least one uplink communication using at least one of a compatible uplink beam associated with the first network node or a non-compatible uplink beam associated with the first network node.

In a sixteenth aspect, alone or in combination with one or more of the first through fifteenth aspects, the second restriction duration comprises at least one flexible TDD duration.

In a seventeenth aspect, alone or in combination with one or more of the first through sixteenth aspects, the second restriction duration comprises a time period during which a communication is transmitted, on a protected time resource associated with the first network node, using at least one of a compatible downlink beam associated with the second network node or a non-compatible downlink beam associated with the second network node.

In an eighteenth aspect, alone or in combination with the seventeenth aspect, the protected time resource comprises at least one of an uplink symbol or a flexible symbol.

In a nineteenth aspect, alone or in combination with one or more of the seventeenth through eighteenth aspects, communicating with the at least one UE comprises receiving at least one uplink communication using only at least one compatible uplink beam associated with the first network node on the protected time resource associated with the first network node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
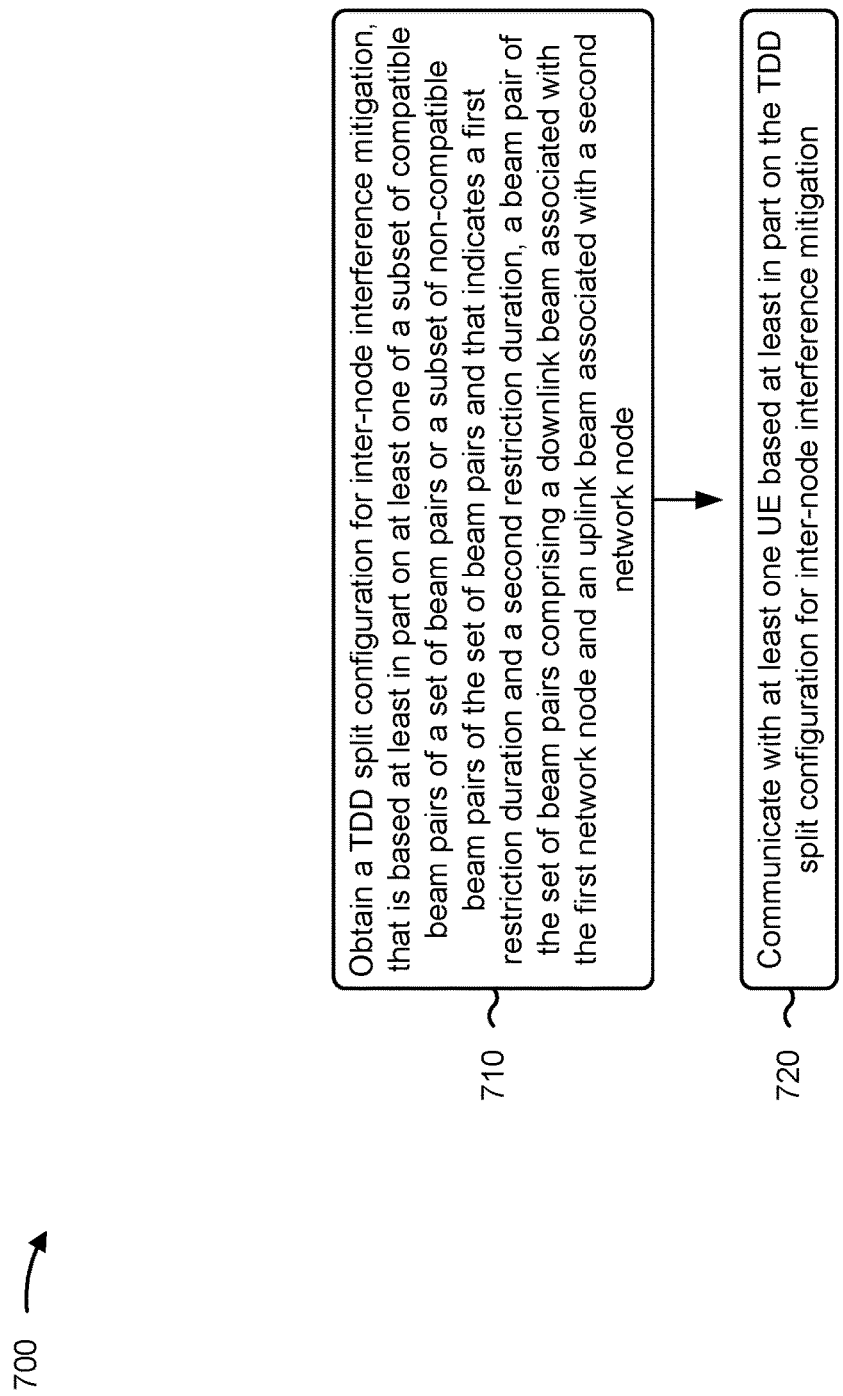

FIG. 7 is a diagram illustrating an example process 700 performed, for example, by a first network node, in accordance with the present disclosure. Example process 700 is an example where the first network node (e.g., network node 510) performs operations associated with a TDD split configuration.

As shown in FIG. 7, in some aspects, process 700 may include obtaining a TDD split configuration for inter-node interference mitigation, that is based at least in part on at least one of a subset of compatible beam pairs of a set of beam pairs or a subset of non-compatible beam pairs of the set of beam pairs and that indicates a first restriction duration and a second restriction duration, a beam pair of the set of beam pairs comprising a downlink beam associated with the first network node and an uplink beam associated with a second network node (block 710). For example, the first network node (e.g., using communication manager 150, reception component 802, and/or transmission component 804, depicted in FIG. 8) may obtain a TDD split configuration for inter-node interference mitigation, that is based at least in part on at least one of a subset of compatible beam pairs of a set of beam pairs or a subset of non-compatible beam pairs of the set of beam pairs and that indicates a first restriction duration and a second restriction duration, a beam pair of the set of beam pairs comprising a downlink beam associated with the first network node and an uplink beam associated with a second network node, as described above.

As further shown in FIG. 7, in some aspects, process 700 may include communicating with at least one UE based at least in part on the TDD split configuration for inter-node interference mitigation (block 720). For example, the first network node (e.g., using communication manager 150, reception component 802, and/or transmission component 804, depicted in FIG. 8) may communicate with at least one UE based at least in part on the TDD split configuration for inter-node interference mitigation, as described above.

Process 700 may include additional aspects, such as any single aspect or any combination of aspects described below and/or in connection with one or more other processes described elsewhere herein.

In a first aspect, the beam pair is a compatible beam pair based at least in part on a performance metric, associated with an impact of a corresponding cross-link interference on the uplink beam, satisfying at least one tolerance criterion, or the beam pair is a non-compatible beam pair based at least in part on the performance metric failing to satisfy the at least one tolerance criterion.

In a second aspect, alone or in combination with the first aspect, process 700 includes receiving, from the second network node, a beam pair compatibility indication that indicates the at least one of the subset of compatible beam pairs or the subset of non-compatible beam pairs.

In a third aspect, alone or in combination with one or more of the first and second aspects, obtaining the TDD split configuration comprises determining the TDD split configuration based at least in part on the at least one of the subset of compatible beam pairs or the subset of incompatible beam pairs.

In a fourth aspect, alone or in combination with one or more of the first through third aspects, obtaining the TDD split configuration comprises obtaining the TDD split configuration based at least in part on a coordination between the first network node and the second network node.

In a fifth aspect, alone or in combination with one or more of the first through fourth aspects, obtaining the TDD split configuration comprises receiving a configuration signal that indicates the TDD split configuration.

In a sixth aspect, alone or in combination the fifth aspect, receiving the TDD split configuration comprises receiving the configuration signal from a centralized unit.

In a seventh aspect, alone or in combination with the sixth aspect, the centralized unit comprises at least one of a distributed unit of a base station, a central unit of an integrated access and backhaul network node, or an AMF.

In an eighth aspect, alone or in combination with one or more of the fifth through seventh aspects, receiving the configuration signal comprises receiving the configuration signal based at least in part on a semi-static signaling pattern.

In a ninth aspect, alone or in combination with the eighth aspect, receiving the configuration signal comprises receiving the configuration signal from the second network node.

In a tenth aspect, alone or in combination with one or more of the first through ninth aspects, the first restriction duration comprises at least one non-flexible TDD duration.

In an eleventh aspect, alone or in combination with one or more of the first through tenth aspects, the first restriction duration comprises a time period during which no communications are transmitted using a non-compatible downlink beam associated with the first network node on a protected time resource associated with the second network node.

In a twelfth aspect, alone or in combination with the eleventh aspect, the protected time resource comprises at least one of an uplink symbol or a flexible symbol.

In a thirteenth aspect, alone or in combination with one or more of the eleventh through twelfth aspects, communicating with the at least one UE comprises refraining from transmitting a downlink communication using a non-compatible downlink beam associated with the first network node on the protected time resource associated with the second network node.

In a fourteenth aspect, alone or in combination with one or more of the eleventh through thirteenth aspects, communicating with the at least one UE comprises transmitting at least one downlink communication using only at least one compatible downlink beam associated with the first network node on the protected time resource associated with the second network node.

In a fifteenth aspect, alone or in combination with one or more of the first through fourteenth aspects, the second restriction duration comprises at least one flexible TDD duration.

In a sixteenth aspect, alone or in combination with one or more of the first through fifteenth aspects, the second restriction duration comprises a time period during which a communication is transmitted, on a protected time resource associated with the second network node, using at least one of a compatible downlink beam associated with the first network node or a non-compatible downlink beam associated with the first network node.

In a seventeenth aspect, alone or in combination with the sixteenth aspect, the protected time resource comprises at least one of an uplink symbol or a flexible symbol.

In an eighteenth aspect, alone or in combination with one or more of the sixteenth through seventeenth aspects, communicating with the at least one UE comprises transmitting, on the protected time resource associated with the second network node, at least one downlink communication using at least one of a compatible downlink beam or a non-compatible downlink beam associated with the first network node.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
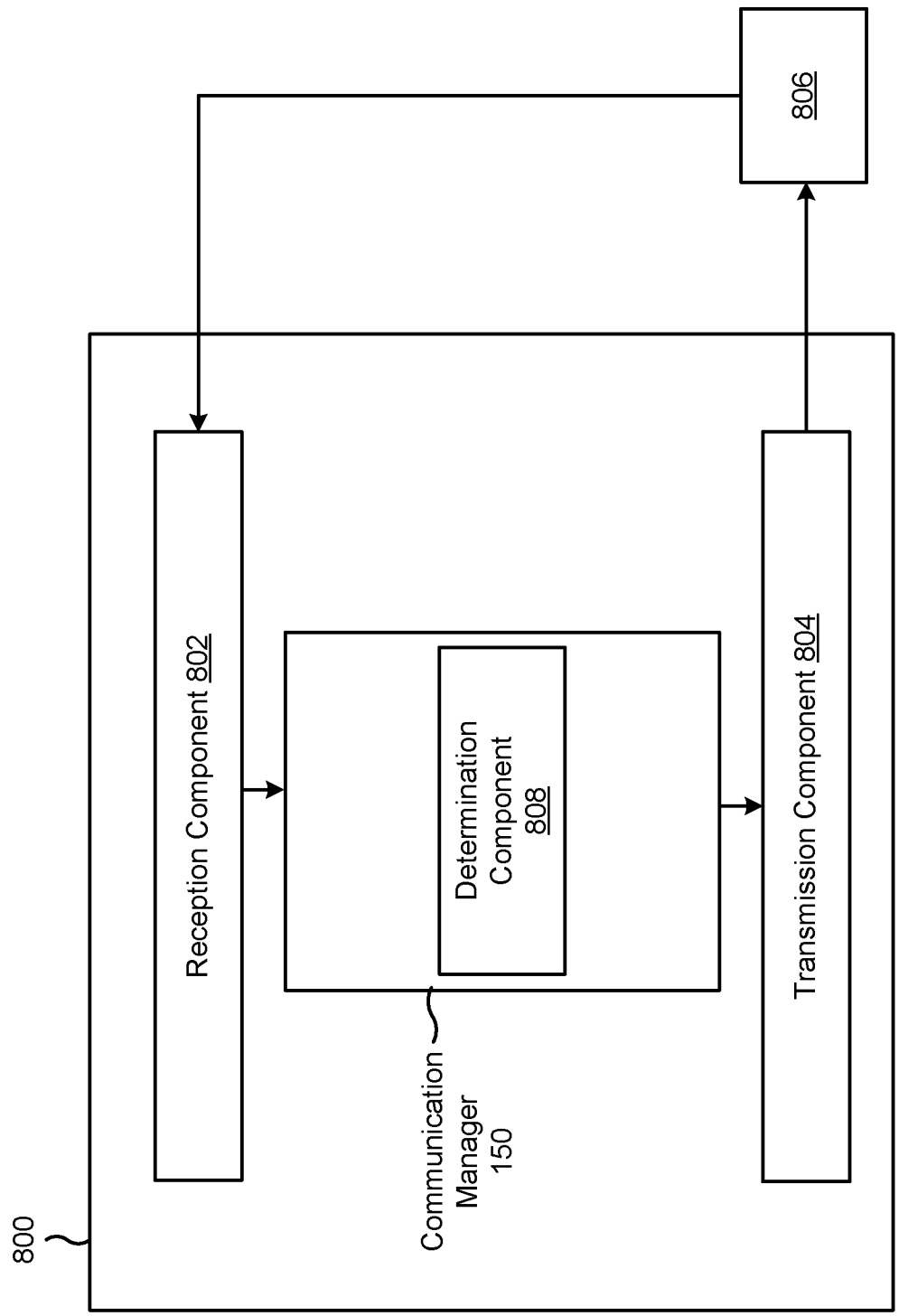
FIG. 8 is a diagram of an example apparatus for wireless communication, in accordance with the present disclosure.

FIG. 8 is a diagram of an example apparatus 800 for wireless communication. The apparatus 800 may be a network node (e.g., a first network node or a second network node), or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a determination component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The communication manager 150, the reception component 802, and/or the transmission component 804 may obtain a TDD split configuration, for inter-node interference mitigation, that is based at least in part on at least one of a subset of compatible beam pairs of a set of beam pairs or a subset of non-compatible beam pairs of the set of beam pairs, and that indicates a first restriction duration and a second restriction duration, a beam pair of the set of beam pairs comprising an uplink beam associated with the first network node and a downlink beam associated with a second network node. In some aspects, the communication manager 150 may include one or more antennas, a modem, a controller/processor, a memory, or a combination thereof, of the base station described in connection with FIG. 2. In some aspects, the communication manager 150 may include the reception component 802 and/or the transmission component 804.

The reception component 802 and/or the transmission component 804 may communicate with at least one UE based at least in part on the TDD split configuration for inter-node interference mitigation. The communication manager 150, the reception component 802, and/or the transmission component 804 may obtain one or more cross-link interference measurements associated with the set of beam pairs.

The determination component 808 may determine, based at least in part on the one or more cross-link interference measurements, the at least one of the subset of compatible beam pairs or the subset of non-compatible beam pairs. In some aspects, the determination component 808 may include one or more antennas, a modem, a controller/processor, a memory, or a combination thereof, of the base station described in connection with FIG. 2. In some aspects, the determination component 808 may include the reception component 802 and/or the transmission component 804. The transmission component 804 may transmit, to the second network node, a beam pair compatibility indication that indicates the at least one of the subset of compatible beam pairs or the subset of incompatible beam pairs.

The communication manager 150, the reception component 802, and/or the transmission component 804 may obtain a TDD split configuration for inter-node interference mitigation, that is based at least in part on at least one of a subset of compatible beam pairs of a set of beam pairs or a subset of non-compatible beam pairs of the set of beam pairs and that indicates a first restriction duration and a second restriction duration, a beam pair of the set of beam pairs comprising a downlink beam associated with the first network node and an uplink beam associated with a second network node. The reception component 802 and/or the transmission component 804 may communicate with at least one UE based at least in part on the TDD split configuration for inter-node interference mitigation. The reception component 802 may receive, from the second network node, a beam pair compatibility indication that indicates the at least one of the subset of compatible beam pairs or the subset of non-compatible beam pairs.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a first network node, comprising: obtaining a time division duplexing (TDD) split configuration, for inter-node interference mitigation, that is based at least in part on at least one of a subset of compatible beam pairs of a set of beam pairs or a subset of non-compatible beam pairs of the set of beam pairs, and that indicates a first restriction duration and a second restriction duration, a beam pair of the set of beam pairs comprising an uplink beam associated with the first network node and a downlink beam associated with a second network node; and communicating with at least one user equipment (UE) based at least in part on the TDD split configuration for inter-node interference mitigation.

Aspect 2: The method of Aspect 1, wherein the beam pair is a compatible beam pair based at least in part on a performance metric, associated with an impact of a corresponding cross-link interference on the uplink beam, satisfying at least one tolerance criterion, or wherein the beam pair is a non-compatible beam pair based at least in part on the performance metric failing to satisfy the at least one tolerance criterion.

Aspect 3: The method of either of Aspects 1 or 2, further comprising: obtaining one or more cross-link interference measurements associated with the set of beam pairs; determining, based at least in part on the one or more cross-link interference measurements, the at least one of the subset of compatible beam pairs or the subset of non-compatible beam pairs; and transmitting, to the second network node, a beam pair compatibility indication that indicates the at least one of the subset of compatible beam pairs or the subset of incompatible beam pairs.

Aspect 4: The method of Aspect 3, wherein obtaining the one or more cross-link measurements comprises determining at least one of a received signal strength indicator (RSSI) or a reference signal received power (RSRP) corresponding to the downlink beam associated with the second network node.

Aspect 5: The method of Aspect 4, wherein determining the at least one of the subset of compatible beam pairs or the subset of incompatible beam pairs comprises determining whether the at least one of the RSSI or the RSRP satisfies a respective compatibility threshold.

Aspect 6: The method of any of Aspects 1-5, wherein obtaining the TDD split configuration comprises determining the TDD split configuration based at least in part on the at least one of the subset of compatible beam pairs or the subset of incompatible beam pairs.

Aspect 7: The method of any of Aspects 1-5, wherein obtaining the TDD split configuration comprises obtaining the TDD split configuration based at least in part on a coordination between the first network node and the second network node.

Aspect 8: The method of any of Aspects 1-5, wherein obtaining the TDD split configuration comprises receiving a configuration signal that indicates the TDD split configuration.

Aspect 9: The method of Aspect 8, wherein receiving the TDD split configuration comprises receiving the configuration signal from a centralized unit.

Aspect 10: The method of Aspect 9, wherein the centralized unit comprises at least one of: a distributed unit of a base station, a central unit of an integrated access and backhaul network node, or an operations, administration and management function.

Aspect 11: The method of any of Aspects 8-10, wherein receiving the configuration signal comprises receiving the configuration signal based at least in part on a semi-static signaling pattern.

Aspect 12: The method of Aspect 11, wherein receiving the configuration signal comprises receiving the configuration signal from the second network node.

Aspect 13: The method of any of Aspects 1-12, wherein the first restriction duration comprises at least one non-flexible TDD duration.

Aspect 14: The method of any of Aspects 1-13, wherein the first restriction duration comprises a time period during which no communications are transmitted using a non-compatible downlink beam associated with the second network node on a protected time resource associated with the first network node.

Aspect 15: The method of Aspect 14, wherein the protected time resource comprises at least one of an uplink symbol or a flexible symbol.

Aspect 16: The method of either of Aspects 14 or 15, wherein communicating with the at least one UE comprises receiving, on the protected time resource associated with the first network node, at least one uplink communication using at least one of a compatible uplink beam associated with the first network node or a non-compatible uplink beam associated with the first network node.

Aspect 17: The method of any of Aspects 1-16, wherein the second restriction duration comprises at least one flexible TDD duration.

Aspect 18: The method of any of Aspects 1-17, wherein the second restriction duration comprises a time period during which a communication is transmitted, on a protected time resource associated with the first network node, using at least one of a compatible downlink beam associated with the second network node or a non-compatible downlink beam associated with the second network node.

Aspect 19: The method of Aspect 18, wherein the protected time resource comprises at least one of an uplink symbol or a flexible symbol.

Aspect 20: The method of either of Aspects 18 or 19, wherein communicating with the at least one UE comprises receiving at least one uplink communication using only at least one compatible uplink beam associated with the first network node on the protected time resource associated with the first network node.

Aspect 21: A method of wireless communication performed by a first network node, comprising: obtaining a time division duplexing (TDD) split configuration for inter-node interference mitigation, that is based at least in part on at least one of a subset of compatible beam pairs of a set of beam pairs or a subset of non-compatible beam pairs of the set of beam pairs and that indicates a first restriction duration and a second restriction duration, a beam pair of the set of beam pairs comprising a downlink beam associated with the first network node and an uplink beam associated with a second network node; and communicating with at least one user equipment (UE) based at least in part on the TDD split configuration for inter-node interference mitigation.

Aspect 22: The method of Aspect 21, wherein the beam pair is a compatible beam pair based at least in part on a performance metric, associated with an impact of a corresponding cross-link interference on the uplink beam, satisfying at least one tolerance criterion, or wherein the beam pair is a non-compatible beam pair based at least in part on the performance metric failing to satisfy the at least one tolerance criterion.

Aspect 23: The method of either of Aspects 21 or 22, further comprising: receiving, from the second network node, a beam pair compatibility indication that indicates the at least one of the subset of compatible beam pairs or the subset of non-compatible beam pairs.

Aspect 24: The method of any of Aspects 21-23, wherein obtaining the TDD split configuration comprises determining the TDD split configuration based at least in part on the at least one of the subset of compatible beam pairs or the subset of incompatible beam pairs.

Aspect 25: The method of any of Aspects 21-24, wherein obtaining the TDD split configuration comprises obtaining the TDD split configuration based at least in part on a coordination between the first network node and the second network node.

Aspect 26: The method of any of Aspects 21-25, wherein obtaining the TDD split configuration comprises receiving a configuration signal that indicates the TDD split configuration.

Aspect 27: The method of Aspect 26, wherein receiving the TDD split configuration comprises receiving the configuration signal from a centralized unit.

Aspect 28: The method of Aspect 27, wherein the centralized unit comprises at least one of: a distributed unit of a base station, a central unit of an integrated access and backhaul network node, or an operations, administration and management function.

Aspect 29: The method of any of Aspects 26-28, wherein receiving the configuration signal comprises receiving the configuration signal based at least in part on a semi-static signaling pattern.

Aspect 30: The method of Aspect 29, wherein receiving the configuration signal comprises receiving the configuration signal from the second network node.

Aspect 31: The method of any of Aspects 21-30, wherein the first restriction duration comprises at least one non-flexible TDD duration.

Aspect 32: The method of any of Aspects 21-31, wherein the first restriction duration comprises a time period during which no communications are transmitted using a non-compatible downlink beam associated with the first network node on a protected time resource associated with the second network node.

Aspect 33: The method of Aspect 32, wherein the protected time resource comprises at least one of an uplink symbol or a flexible symbol.

Aspect 34: The method of either of Aspects 32 or 33, wherein communicating with the at least one UE comprises refraining from transmitting a downlink communication using a non-compatible downlink beam associated with the first network node on the protected time resource associated with the second network node.

Aspect 35: The method of any of Aspects 32-34, wherein communicating with the at least one UE comprises transmitting at least one downlink communication using only at least one compatible downlink beam associated with the first network node on the protected time resource associated with the second network node.

Aspect 36: The method of any of Aspects 21-35, wherein the second restriction duration comprises at least one flexible TDD duration.

Aspect 37: The method of any of Aspects 21-36, wherein the second restriction duration comprises a time period during which a communication is transmitted, on a protected time resource associated with the second network node, using at least one of a compatible downlink beam associated with the first network node or a non-compatible downlink beam associated with the first network node.

Aspect 38: The method of Aspect 37, wherein the protected time resource comprises at least one of an uplink symbol or a flexible symbol.

Aspect 39: The method of either of Aspects 37 or 38, wherein communicating with the at least one UE comprises transmitting, on the protected time resource associated with the second network node, at least one downlink communication using at least one of a compatible downlink beam or a non-compatible downlink beam associated with the first network node.

Aspect 40: An apparatus for wireless communication at a device, comprising a processor; memory coupled with the processor; and instructions stored in the memory and executable by the processor to cause the apparatus to perform the method of one or more of Aspects 1-20.

Aspect 41: A device for wireless communication, comprising a memory and one or more processors coupled to the memory, the one or more processors configured to perform the method of one or more of Aspects 1-20.

Aspect 42: An apparatus for wireless communication, comprising at least one means for performing the method of one or more of Aspects 1-20.

Aspect 43: A non-transitory computer-readable medium storing code for wireless communication, the code comprising instructions executable by a processor to perform the method of one or more of Aspects 1-20.

Aspect 44: A non-transitory computer-readable medium storing a set of instructions for wireless communication, the set of instructions comprising one or more instructions that, when executed by one or more processors of a device, cause the device to perform the method of one or more of Aspects 1-20.

Aspect 45: An apparatus for wireless communication at a device, comprising a processor; memory coupled with the processor; and instructions stored in the memory and executable by the processor to cause the apparatus to perform the method of one or more of Aspects 21-39.

Aspect 46: A device for wireless communication, comprising a memory and one or more processors coupled to the memory, the one or more processors configured to perform the method of one or more of Aspects 21-39.

Aspect 47: An apparatus for wireless communication, comprising at least one means for performing the method of one or more of Aspects 21-39.

Aspect 48: A non-transitory computer-readable medium storing code for wireless communication, the code comprising instructions executable by a processor to perform the method of one or more of Aspects 21-39.

Aspect 49: A non-transitory computer-readable medium storing a set of instructions for wireless communication, the set of instructions comprising one or more instructions that, when executed by one or more processors of a device, cause the device to perform the method of one or more of Aspects 21-39.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first network node for wireless communication, comprising:
    a memory; and
    one or more processors, coupled to the memory, configured to:
        obtain a time division duplexing (TDD) split configuration that includes an indication, to the first network node and to a second network node, of a first restriction duration and a second restriction duration,
            wherein the TDD split configuration is for inter-node interference mitigation,
            wherein the TDD split configuration is based at least in part on at least one of a subset of compatible beam pairs of a set of beam pairs or a subset of non-compatible beam pairs of the set of beam pairs, and
            wherein a beam pair of the set of beam pairs comprises an uplink beam associated with the first network node receiving uplink communications from one or more first user equipments (UEs) and a downlink beam associated with the second network node transmitting downlink communications to one or more second UEs; and
        communicate with at least one first UE, of the one or more first UEs, based at least in part on the TDD split configuration for inter-node interference mitigation.

2. The first network node of claim 1, wherein the beam pair is a compatible beam pair based at least in part on a performance metric, associated with an impact of a corresponding cross-link interference on the uplink beam, satisfying at least one tolerance criterion, or wherein the beam pair is a non-compatible beam pair based at least in part on the performance metric failing to satisfy the at least one tolerance criterion.

3. The first network node of claim 1, wherein the one or more processors are further configured to:
    obtain one or more cross-link interference measurements associated with the set of beam pairs;

determine, based at least in part on the one or more cross-link interference measurements, the at least one of the subset of compatible beam pairs or the subset of non-compatible beam pairs; and transmit, to the second network node, a beam pair compatibility indication that indicates the at least one of the subset of compatible beam pairs or the subset of non-compatible beam pairs.

4. The first network node of claim 3, wherein the one or more processors, to obtain the one or more cross-link interference measurements, are configured to determine at least one of a received signal strength indicator (RSSI) or a reference signal received power (RSRP) corresponding to the downlink beam associated with the second network node.

5. The first network node of claim 4, wherein the one or more processors, to determine the at least one of the subset of compatible beam pairs or the subset of non-compatible beam pairs, are configured to determine whether the at least one of the RSSI or the RSRP satisfies a respective compatibility threshold.

6. The first network node of claim 1, wherein the one or more processors, to obtain the TDD split configuration, are configured to:
determine the TDD split configuration based at least in part on the at least one of the subset of compatible beam pairs or the subset of non-compatible beam pairs;
obtain the TDD split configuration based at least in part on a coordination between the first network node and the second network node; or
receive a configuration signal that indicates the TDD split configuration.

7. The first network node of claim 6, wherein the one or more processors, to receive the TDD split configuration, are configured to receive the configuration signal from a centralized unit or the second network node.

8. The first network node of claim 7, wherein the centralized unit comprises at least one of:
a distributed unit of a base station,
a central unit of an integrated access and backhaul network node, or
an operations, administration and management function.

9. The first network node of claim 6, wherein the one or more processors, to receive the configuration signal, are configured to receive the configuration signal based at least in part on a semi-static signaling pattern.

10. The first network node of claim 1, wherein the first restriction duration comprises at least one non-flexible TDD duration.

11. The first network node of claim 1, wherein the first restriction duration comprises a time period during which no communications are transmitted using a non-compatible downlink beam associated with the second network node on a protected time resource associated with the first network node.

12. The first network node of claim 11, wherein the protected time resource comprises at least one of an uplink symbol or a flexible symbol.

13. The first network node of claim 11, wherein the one or more processors, to communicate with the at least one first UE, are configured to receive, on the protected time resource associated with the first network node, at least one uplink communication using at least one of a compatible uplink beam associated with the first network node or a non-compatible uplink beam associated with the first network node.

14. The first network node of claim 1, wherein the second restriction duration comprises at least one flexible TDD duration.

15. The first network node of claim 1, wherein the second restriction duration comprises a time period during which a communication is transmitted, on a protected time resource associated with the first network node, using at least one of a compatible downlink beam associated with the second network node or a non-compatible downlink beam associated with the second network node.

16. The first network node of claim 15, wherein the protected time resource comprises at least one of an uplink symbol or a flexible symbol.

17. The first network node of claim 15, wherein the one or more processors, to communicate with the at least one first UE, are configured to receive at least one uplink communication using only at least one compatible uplink beam associated with the first network node on the protected time resource associated with the first network node.

18. A first network node for wireless communication, comprising:
a memory; and
one or more processors, coupled to the memory, configured to:
obtain a time division duplexing (TDD) split configuration that includes an indication, to the first network node and to a second network node, of a first restriction duration and a second restriction duration, wherein the TDD split configuration is for inter-node interference mitigation,
wherein the TDD split configuration is based at least in part on at least one of a subset of compatible beam pairs of a set of beam pairs or a subset of non-compatible beam pairs of the set of beam pairs, and
wherein a beam pair of the set of beam pairs comprises a downlink beam associated with the first network node transmitting downlink communications to one or more first user equipments (UEs) and an uplink beam associated with the second network node receiving uplink communications from one or more second UEs; and
communicate with at least one first UE, of the one or more first UEs, based at least in part on the TDD split configuration for inter-node interference mitigation.

19. The first network node of claim 18, wherein the beam pair is a compatible beam pair based at least in part on a performance metric, associated with an impact of a corresponding cross-link interference on the uplink beam, satisfying at least one tolerance criterion, or wherein the beam pair is a non-compatible beam pair based at least in part on the performance metric failing to satisfy the at least one tolerance criterion.

20. The first network node of claim 18, wherein the one or more processors are further configured to:
receive, from the second network node, a beam pair compatibility indication that indicates the at least one of the subset of compatible beam pairs or the subset of non-compatible beam pairs.

21. The first network node of claim 18, wherein the first restriction duration comprises a time period during which no communications are transmitted using a non-compatible downlink beam associated with the first network node on a protected time resource associated with the second network node.

22. The first network node of claim 21, wherein the protected time resource comprises at least one of an uplink symbol or a flexible symbol.

23. The first network node of claim 21, wherein the one or more processors, to communicate with the at least one first UE, are configured to refrain from transmitting a downlink communication using a non-compatible downlink beam associated with the first network node on the protected time resource associated with the second network node.

24. The first network node of claim 21, wherein the one or more processors, to communicate with the at least one first UE, are configured to transmit at least one downlink communication using only at least one compatible downlink beam associated with the first network node on the protected time resource associated with the second network node.

25. The first network node of claim 18, wherein the second restriction duration comprises a time period during which a communication is transmitted, on a protected time resource associated with the second network node, using at least one of a compatible downlink beam associated with the first network node or a non-compatible downlink beam associated with the first network node.

26. The first network node of claim 25, wherein the one or more processors, to communicate with the at least one first UE, are configured to transmit, on the protected time resource associated with the second network node, at least one downlink communication using at least one of a compatible downlink beam or a non-compatible downlink beam associated with the first network node.

27. A method of wireless communication performed by a first network node, comprising:
 obtaining a time division duplexing (TDD) split configuration that includes an indication, to the first network node and to a second network node, of a first restriction duration and a second restriction duration,
  wherein the TDD split configuration is for inter-node interference mitigation,
  wherein the TDD split configuration is based at least in part on at least one of a subset of compatible beam pairs of a set of beam pairs or a subset of non-compatible beam pairs of the set of beam pairs, and
  wherein a beam pair of the set of beam pairs comprises an uplink beam associated with the first network node receiving uplink communications from one or more first user equipments (UEs) and a downlink beam associated with the second network node transmitting downlink communications to one or more second UEs; and
 communicating with at least one first UE, of the one or more first UEs, based at least in part on the TDD split configuration for inter-node interference mitigation.

28. The method of claim 27, wherein the first restriction duration comprises a time period during which no communications are transmitted using a non-compatible downlink beam associated with the second network node on a first protected time resource associated with the first network node, and wherein the second restriction duration comprises a time period during which a communication is transmitted, on a second protected time resource associated with the first network node, using at least one of a compatible downlink beam associated with the second network node or a non-compatible downlink beam associated with the second network node.

29. A method of wireless communication performed by a first network node, comprising:
 obtaining a time division duplexing (TDD) split configuration that includes an indication, to the first network node and to a second network node, of a first restriction duration and a second restriction duration,
  wherein the TDD split configuration is for inter-node interference mitigation,
  wherein the TDD split configuration is based at least in part on at least one of a subset of compatible beam pairs of a set of beam pairs or a subset of non-compatible beam pairs of the set of beam pairs, and
  wherein a beam pair of the set of beam pairs comprises a downlink beam associated with the first network node transmitting downlink communications to one or more first user equipments (UEs) and an uplink beam associated with the second network node receiving uplink communications from one or more second UEs; and
 communicating with at least one first UE, of the one or more first UEs, based at least in part on the TDD split configuration for inter-node interference mitigation.

30. The method of claim 29, wherein the first restriction duration comprises a time period during which no communications are transmitted using a non-compatible downlink beam associated with the first network node on a first protected time resource associated with the second network node, and wherein the second restriction duration comprises a time period during which a communication is transmitted, on a second protected time resource associated with the second network node, using at least one of a compatible downlink beam associated with the first network node or a non-compatible downlink beam associated with the first network node.

* * * * *